United States Patent Office 3,417,455
Patented Dec. 24, 1968

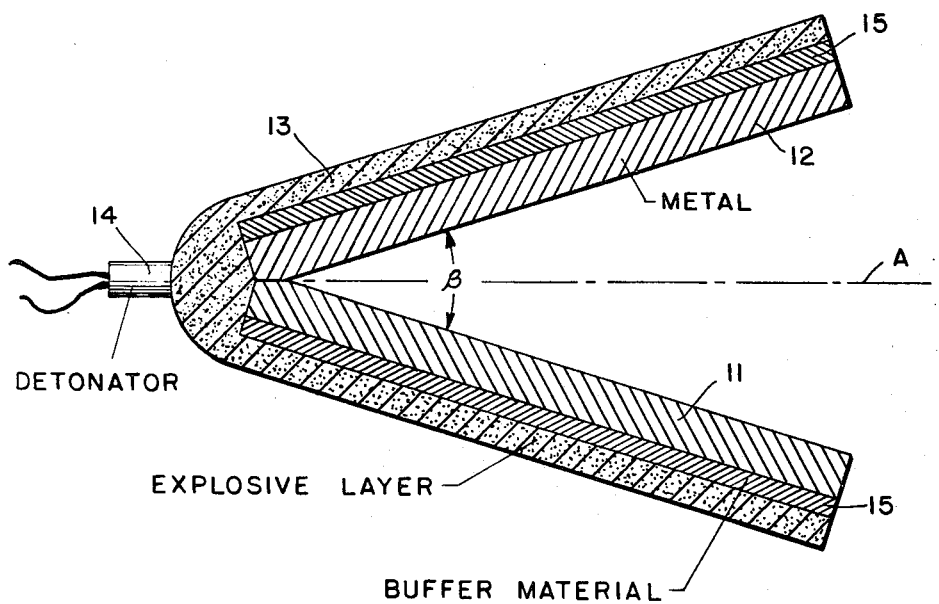

3,417,455
EXPLOSIVE WELDING
John Pearson, China Lake, Calif., assignor to the United States of America as represented by the Secretary of the Navy
Filed Jan. 18, 1961, Ser. No. 83,597
2 Claims. (Cl. 29—470.1)

ABSTRACT OF THE DISCLOSURE

The improvement in the process of explosive welding wherein the parts positioned with an angular gap in the area of the intended joint are coated with a buffer material prior to positioning of the explosive layer is disclosed.

The invention herein described may be manufactured and used by or for the Government of the United States of America for governmental purposes without the payment of any royalties thereon or therefor.

The present invention relates to welding or high strength bonding of metal parts by means of explosives and more particularly to an explosive welding method.

One of the areas in which explosives have most recently been applied is in the explosive welding of metal parts. In the field of explosive welding little work has been reported. The old method of resistance welding consisting of firmly clamping the pieces to be joined, passing an electric current through the joint of contact until the metal is heated to the plastic state and then forcibly squeezing the pieces together is in general a machine operation using compressed air. A similar method, called forge welding, comprises heating the pieces to be joined in a forge fire until plastic and then forcing them together by hammer blows. Although these methods have served their purpose, they have not proved entirely satisfactory under all conditions. Their big disadvantage is limited portability and the possibility that the parts to be joined may not be accessible to conventional equipment.

The general purpose of this invention is to provide a technique whereby metal parts may be explosively welded when and where desired and which will prevent costly accidental welding.

An object of the present invention is to provide a means whereby dissimilar metals may be joined by surface jetting.

Another object is to provide a method whereby explosive welding is controlled thereby avoiding costly accidental welding.

A further object of the invention is the provision of a method which will permit in-the-field welding where conventional equipment is not available.

Other objects, features and many attendant advantages of this invention will be readily appreciated as the same becomes better understood by reference to the following detailed description when considered in connection with the accompanying drawing.

Referring to the drawing which shows an embodiment of the invention, two flat metal plates, designated by numerals 11 and 12, of similar or dissimilar metals are arranged at some angle $\beta$. The outer surface of said plates being covered or coated with a layer of explosive 13. A detonator 14 is disposed at the outer surface of the apex of the angle formed by said metal plates and explosive layer. A buffer material 15 may be placed between plates 11 and 12 and explosive 13 to help preserve the outer surface of the metal.

In operation, when detonator 14 is activated by an electric current, explosive 13 is detonated, creating extremely high pressures on the outer surfaces of metal plates 11 and 12 which begin to move toward each other at high relative velocity and with great pressure. Because of the tremendous pressures involved, the contacting surfaces of the metal plates behave in effect as liquids and fusion of the two metals occurs. There is a tendency for the metals, at their interacting surfaces, to project forward a jet of metallic particles along a line A termed the "line of jet action." Thus plastic interaction at the interacting surfaces creates a true fusion weld.

When the two metal plates are brought together with a high relative velocity with some included angle of collapse $\beta$, as shown in the drawing, the metal close to the interacting surfaces participates in an effect called "surface jetting." This surface jetting produces severe localized plastic deformation of the metals. The interaction between the jet elements of the two surfaces followed by a rapid release of load leaves the two metal parts permanently bonded together with high strength. The high interface pressures required to produce this effect can be obtained with high explosives. The term "explosive welding" describes the type operation herein set out where contact explosive loads are used to produce a high degree of plastic interaction between the surfaces to be joined.

The embodiment described shows a simple arrangement for welding plates. The geometry of the metal-explosive system will vary depending on the shape, thickness, material, etc., of the parts to be welded. The type, thickness, and shape of the explosive, the method of initiation, the angle $\beta$ between the surfaces, will all vary depending on the parts to be bonded together. Buffer material between metal and explosive may, or may not, be used depending upon the system. For end welding two pieces of steel pipe, for example, the method might consist of a metal-explosive collar which would wrap around the prepared ends of the pipe at the joint.

Conventional electric detonators are preferred though other types may be used.

It is apparent that a large number of explosives can be used. High explosives are preferred because they produce greater pressures. When a high explosive charge is placed in intimate contact with a steel body and detonated, pressures estimated to be as great as four million p.s.i. may be developed at the metal-explosive surface. Pressures of this magnitude are developed whenever the explosive is in contact with the metal. This means that the basic restriction in the magnitude of the force which can be developed is related to the surface area of the metal which can be exposed to direct explosive contact. Thus, if an explosive charge is in direct contact with 100 square inches of steel surface, a force of approximately 400,000,-000 pounds may be developed. If this concept is extended to large metal objects where the surface dimensions are in terms of feet, contact charges can be used to produce forces measured in billions of pounds. Force figures of this size are essentially meaningless since it is almost impossible to grasp the physical concept of what they imply. Their meaning in terms of available work on the body is further complicated by the fact that load duration is measured in microseconds.

The preferred explosive for use in the invention is a plastic demolition explosive that can be molded into shape and as standardized by the United States is designated as Composition C–3 which comprises 78.0±2.0 percent RDX plus nitrocellulose and 22.0±2.0 percent plasticizer minus nitrocellulose. Composition C–4, a puttylike explosive, somewhat less sensitive to impact than Composition C–3, is also a suitable explosive. Its composition is essentially 91 percent RDX, 2.1 percent polisobutylene, 1.6 percent motor oil, and 5.3 percent di-(2-ethylhexyl) sebacate. Both compositions C–3 and C–4 are standard explosives.

The buffer material which may be used to help preserve the outer surface of the metal in the technique described herein may be rubber, plastic, or even another metal.

For many applications one plate may be fixed and the other arranged at an angle and movable relative thereto, the explosive cover being applied to the movable plate. Various arrangements produce surface jetting at the interacting surfaces which results in a permanent bond, as described in "Steel," Mar. 21, 1960.

Obviously many modifications and variations of the present invention are possible in the light of the above teachings. It is therefore to be understood that within the scope of the appended claims the invention may be practiced otherwise than as specifically described.

What is claimed is:

1. A method of welding two dissimilar metal plates comprising the steps of arranging the inner surface of said plates in such a manner as to form a V joint having an included angle greater than zero degree, coating the outer surfaces of said plates with a buffer material, covering said buffer material with a plastic explosive and initiating detonation of said explosive at the apex of said V joint whereby great pressure on the plates causes the surfaces of said plates to behave as a liquid and fusion of the parts takes place.

2. A method of fusion welding metal parts having flat surfaces comprising the steps of disposing said parts in such a manner as to form a V joint having an included angle greater than zero, coating the outer surface of at least one of said parts with a buffer material, applying a layer of explosive to said coated surface, and detonating said explosive at the apex of said V joint for bringing said flat surfaces into contact under great pressure and with high relative velocity and causing localized plastic deformation of the metals of said flat surfaces whereby surface jetting occurs and said flat surfaces become bonded.

References Cited

UNITED STATES PATENTS

| | | |
|---|---|---|
| 2,961,357 | 11/1960 | Earnhardt et al. |
| 2,751,808 | 6/1959 | MacDonald et al. |
| 3,060,879 | 10/1962 | Staba _____ 29—421 X |
| 3,036,374 | 5/1962 | Williams _____ 29—421 |

OTHER REFERENCES

Steel: Aug. 25, 1958, pp. 82–86.
Product Engineering: April 13, 1959, pp. 62 and 63.
The Tool Mfg. Engineer: July 1961, pp. 75–78.

JOHN F. CAMPBELL, *Primary Examiner.*

PAUL M. COHEN, *Assistant Examiner.*

U.S. Cl. X.R.

29—421, 497.5